(12) United States Patent
Frazier, Jr.

(10) Patent No.: US 8,307,815 B2
(45) Date of Patent: Nov. 13, 2012

(54) CRANKCASE VENTILATION FILTER ASSEMBLY

(75) Inventor: Ronald G. Frazier, Jr., Red Banks, MS (US)

(73) Assignee: Parker-Hannifin Corporation, Cleveland, OH (US)

( * ) Notice: Subject to any disclaimer, the term of this patent is extended or adjusted under 35 U.S.C. 154(b) by 516 days.

(21) Appl. No.: 12/635,212

(22) Filed: Dec. 10, 2009

(65) Prior Publication Data

US 2010/0139585 A1    Jun. 10, 2010

Related U.S. Application Data

(60) Provisional application No. 61/121,376, filed on Dec. 10, 2008, provisional application No. 61/219,122, filed on Jun. 22, 2009.

(51) Int. Cl.
*F02B 25/06* (2006.01)

(52) U.S. Cl. ........ 123/572; 123/573; 123/574; 137/210; 137/418; 137/429

(58) Field of Classification Search .................. 123/572, 123/573, 574; 137/210, 418, 429
See application file for complete search history.

(56) References Cited

U.S. PATENT DOCUMENTS

| | | | |
|---|---|---|---|
| 2,198,790 A * | 4/1940 | Roddewig | 123/574 |
| 2,289,553 A | 7/1942 | Root | |
| 3,455,285 A | 7/1969 | Sheppard | |
| 4,066,055 A | 1/1978 | Hager | |
| 4,210,113 A | 7/1980 | Heffernan | |
| 4,366,717 A | 1/1983 | Foord et al. | |
| 4,724,807 A | 2/1988 | Walker | |
| 4,823,727 A * | 4/1989 | Baggett et al. | 116/272 |
| 5,564,401 A | 10/1996 | Dickson | |
| 6,161,529 A | 12/2000 | Burgess | |
| 6,557,536 B2 | 5/2003 | Burgess | |
| 6,561,171 B2 | 5/2003 | Burgess | |
| 6,907,869 B2 * | 6/2005 | Burgess et al. | 123/572 |
| 2008/0155949 A1 | 7/2008 | Dunsch et al. | |

FOREIGN PATENT DOCUMENTS

JP    58126412    7/1983

* cited by examiner

*Primary Examiner* — Marguerite McMahon
*Assistant Examiner* — James Kim
(74) *Attorney, Agent, or Firm* — Renner, Otto, Boisselle & Sklar, LLP (57) ABSTRACT

A filter assembly (100) comprises a housing (200) and a filter cartridge (300) that incorporates crankcase pressure-regulating components. The cartridge (300) includes an end cap (330), a plunger (340), and a spring (350). When the filter cartridge (300) is installed in the housing (200), the plunger (340) interacts with a podium (224), in response to crankcase pressure, to allow or block fluid communication with the inlet chamber (111).

20 Claims, 8 Drawing Sheets

CRANKCASE VENTILATION FILTER ASSEMBLY

RELATED APPLICATIONS

This application claims priority of U.S. Provisional Application No. 61/121,376 filed on Dec. 10, 2008 and U.S. Provisional Application No. 61/219,122 filed Jun. 22, 2009. The entire disclosures of these provisional applications are hereby incorporated by reference. If incorporated-by-reference subject matter is inconsistent with subject matter expressly set forth in the written specification (and/or drawings) of the present disclosure, the latter governs to the extent necessary to eliminate indefiniteness and/or clarity-lacking issues.

BACKGROUND

An internal combustion engine (e.g., a diesel engine) typically comprises a crankcase having a breather and an oil pan. Crankcase ventilation fumes (e.g., fumes that leak past the piston rings and through circulating oil) leave the crankcase through its breather. A filter assembly, having a gas inlet connected to the crankcase breather, can filter the ventilation fumes to supply clean gas to engine's air intake line. This filter assembly can also separate oil from the filtered gas and return it the crankcase oil pan. And, if the filter assembly includes a pressure regulator, it can help counteract excessive negative crankcase pressures.

SUMMARY

A filter assembly is provided that includes a crankcase pressure regulator. In this assembly, the filter cartridge incorporates some key pressure-regulating components, whereby they are periodically replaced along with the rest of the cartridge. The cartridge-incorporated components can include, for example, a plunger and/or a spring that manipulate a movable podium to open/close a path into the filter's inlet chamber.

DESCRIPTION

Figure 1:
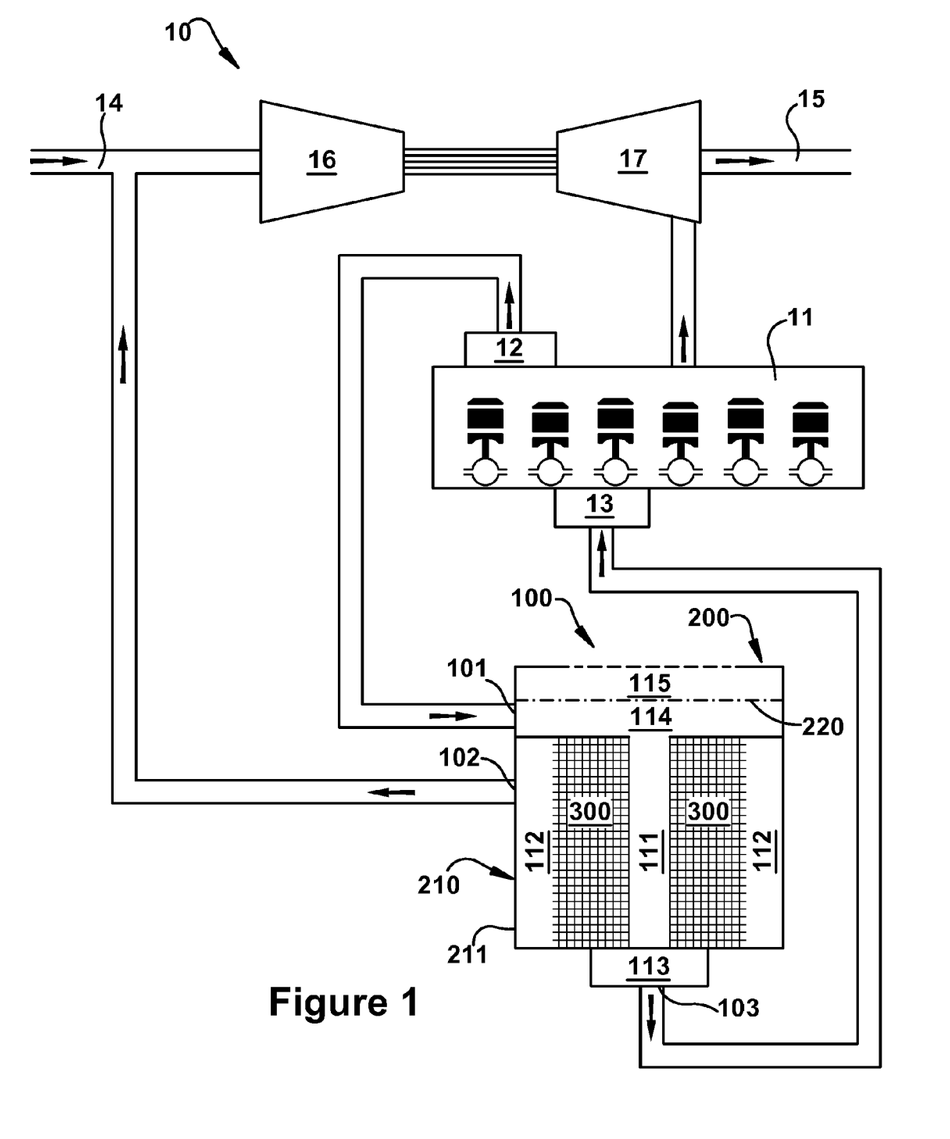
FIG. 1 is schematic diagram of an internal combustion engine that includes the filter assembly.

Referring now to the drawings, and initially to FIG. 1, an internal combustion engine 10 (e.g., a diesel engine) is schematically shown. The engine 10 includes a crankcase 11 (with a breather 12 and an oil pan 13), an air intake line 14, and an exhaust line 15. Intake air passes through a compressor 16 on route to the crankcase 11 and combustion gas passes through a turbocharger 17 on route to the exhaust line 15. Crankcase ventilation fumes (e.g., fumes that leak past the piston rings and through circulating oil) leave the crankcase 11 through its breather 12.

The engine 10 further comprises a filter assembly 100 having a gas inlet 101 connected to the crankcase breather 12, a gas outlet 102 connected to the air intake line 14, and an oil drain 103 connected to the crankcase oil pan 13. The filter assembly 100 has an inlet chamber 111 in fluid communication with the inlet 101, an outlet chamber 112 in communication with the outlet 102, and an oil-collection chamber 113 in fluid communication with the oil drain 103. A pressure-regulation chamber 114 is situated between the inlet 101 and the inlet chamber 111. A volume-compensating chamber 115 is fluidly isolated from the rest of the chambers 111-114 and has vents or other openings that communicate with the atmosphere.

The filter assembly 100 comprises a housing 200 and a filter cartridge 300 removably installed within the housing 200. In most filtering situations, the housing 200 will be considered a permanent part of the filter assembly 100 and the cartridge 300 will be considered a replacement part that is periodically renewed over the filter's useful lifetime.

The housing 200 comprises a canister 210 forming an outline envelope 211 around the chambers 111-115. The filter cartridge 300 fluidly separates the inlet chamber 111 (and the pressure-regulating chamber 114) from the outlet chamber 112 within this envelope 211. Thus, gas entering the inlet 101 must flow through the cartridge 300 (and more particularly its filtering media 310, introduced below) to reach the outlet 102. The housing 200 additionally comprises a partition 220 that moves in response to crankcase pressure. The partition 220 is positioned within the envelope 211 and forms a movable border between the pressure-regulating chamber 114 and the volume-compensating chamber 115.

As ventilation fumes from the crankcase breather 12 flow from the gas inlet 101 to the gas outlet 102, they are filtered by the cartridge 300 and clean gas is supplied to the air intake line 14. The filter assembly 100 also separates oil from the filtered gas, collects the separated oil in the chamber 113, and returns the collected oil (via drain 103) back to the crankcase pan 13. And, thanks to the movable partition 220 (and interacting components), the filter assembly 100 also regulates crankcase pressure.

Figure 2:
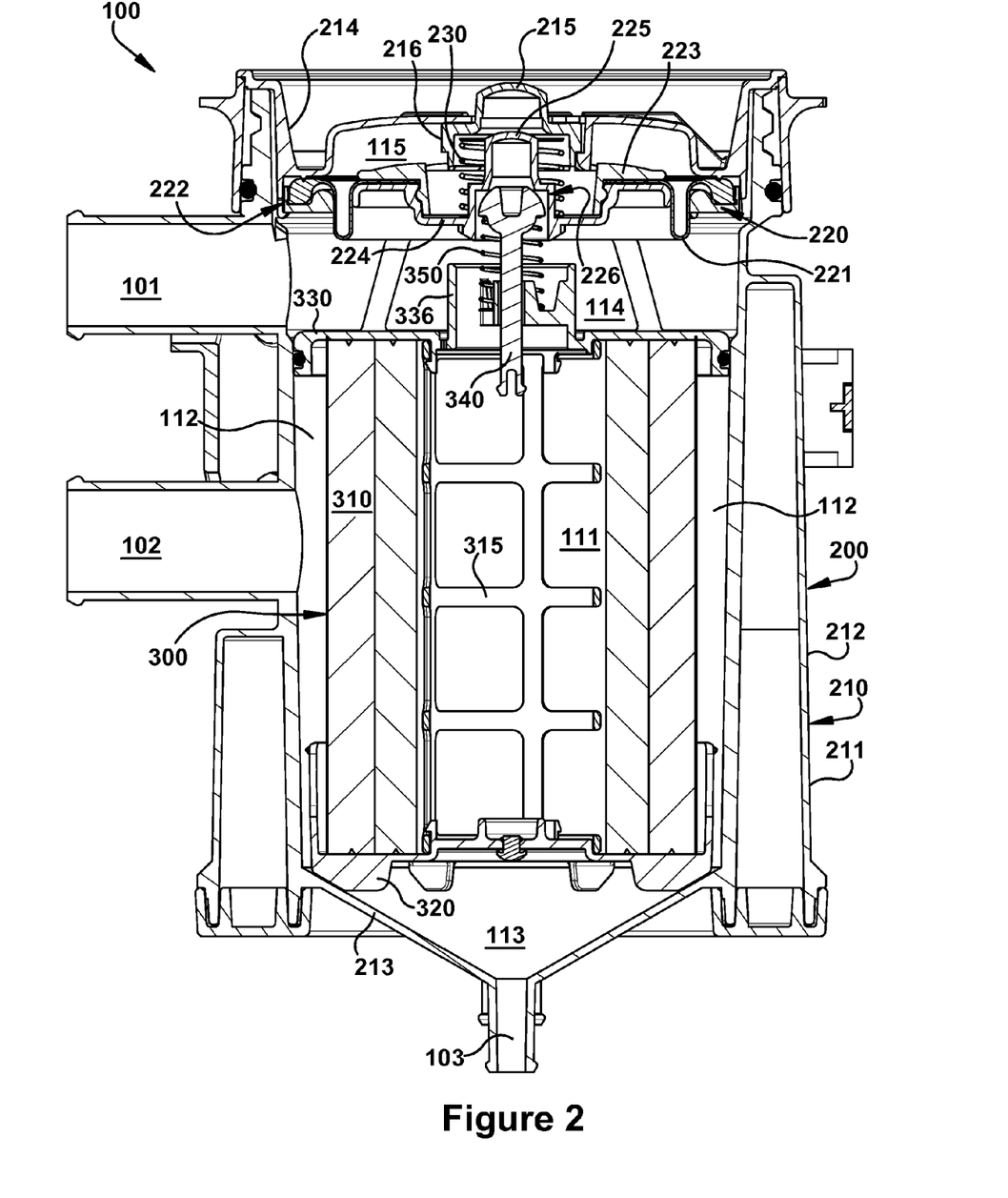
FIG. 2 is a sectional view of the filter assembly, the assembly being shown in a neutral condition.

Referring now to FIG. 2, the filter assembly 100 is shown more pictorially. The canister 210 comprises a side wall structure 212, a bottom wall structure 213, and a top wall structure 214 that together form the chamber-outline envelope 211. The side wall structure 212 additionally forms the inlet 101, the outlet 102, and the outer perimeter of the chambers 112 and 114. The bottom wall structure 213 additionally forms the oil drain 103, and the sloped floor of the oil chamber 113. The top wall structure 214 additionally forms the roof of the volume-compensating chamber 115, a central cupola 215, and circular rim 216 that surrounds the cupola 215. The vent openings for the volume-compensating chamber 115 can be formed in the top wall structure 214 (e.g., in its roof).

The wall structures 212-214 can additionally include house-mounting flanges, cartridge-installation-coordinating elements, and/or wall-to-wall connection components.

The crankcase-pressure-responsive partition 220 comprises an annular diaphragm 221 having its outer diameter fixedly anchored to the canister 210 by clamps 222. The diaphragm's inner diameter is connected by clamps 223 to a circular (and movable) podium 224. The circular podium 224 has a central pulpit 225 sized to fit within the canister's cupola 215 and a raised hem 226 therearound forming a pocket. A spring 230 is situated around the hem 226 and is captured between the partition's podium 224 and the cupola's rim 216. The spring 230 biases the podium 224 downward and away from the cupola 215.

Figure 3:
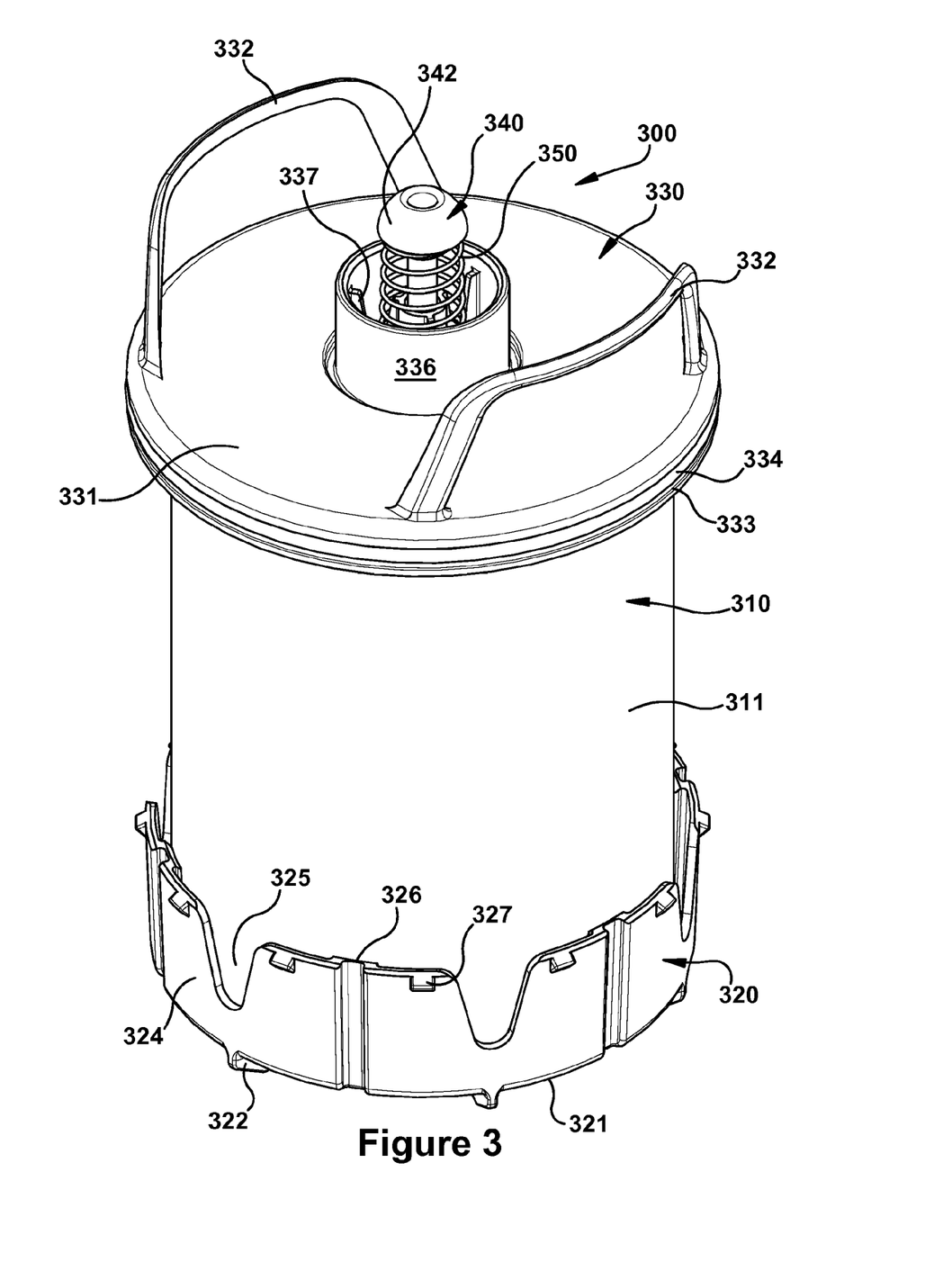
FIG. 3 is a perspective view of the filter cartridge.
Figure 4:
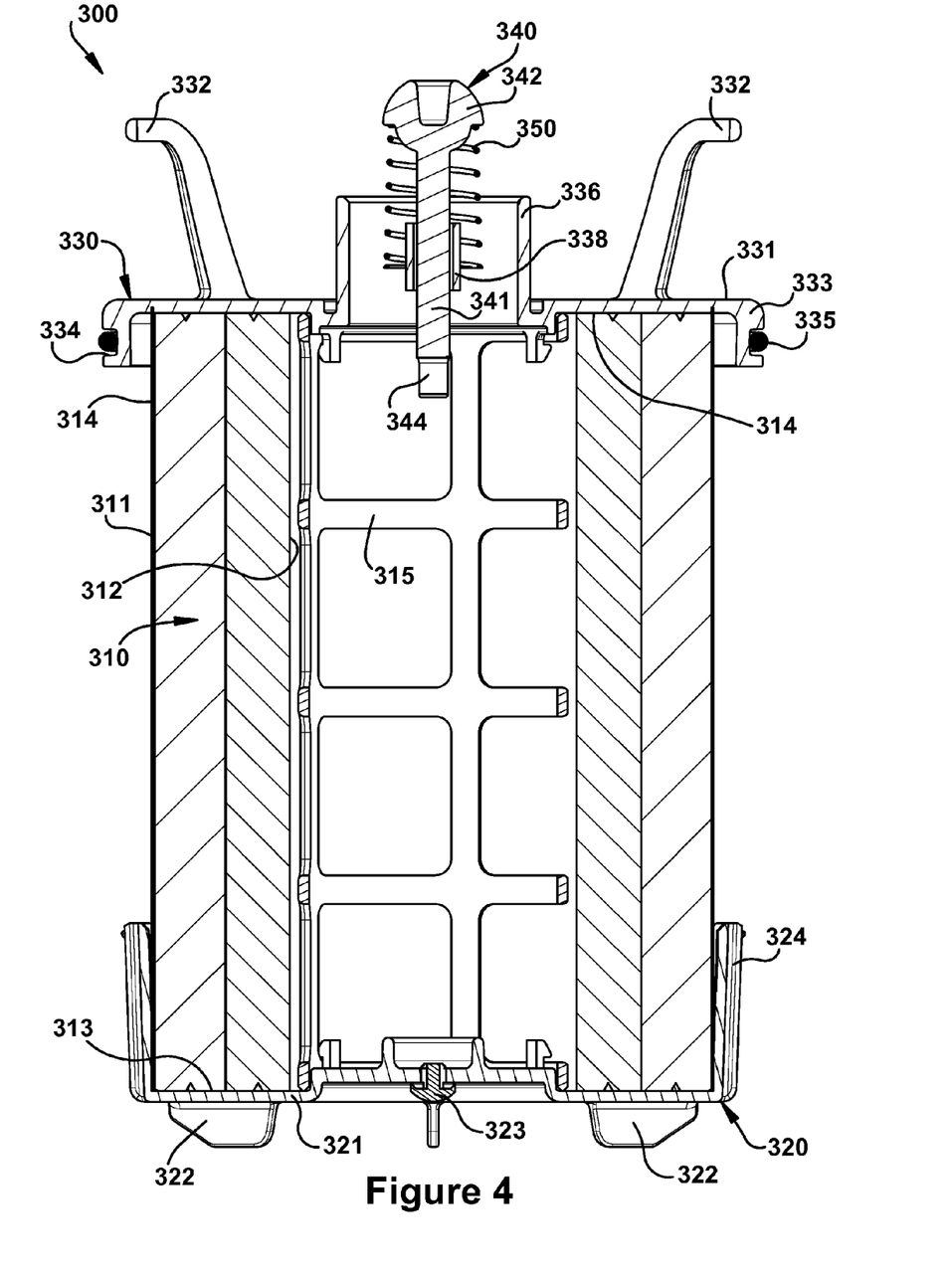
FIG. 4 is a sectional view of the filter cartridge.

Referring now to FIGS. 3-4, the filter cartridge 300 is shown alone. The cartridge 300 comprises filtration media 310 having a cylindrical shape with a radially outer side 311, a radially inner side 312, a bottom axial face 313, and top axial face 314. A gridded center tube 315 can (or cannot) be positioned adjacent the media's radially inner side 312. When the filter cartridge 300 is installed in the housing 200, the radially inner side 312 forms the inlet chamber 111. While the illustrated filtration media 310 has two concentric layers of filtering material, more (e.g., three, four, etc.) or less (e.g., one) layers are possible and contemplated.

The filter cartridge 300 can additionally comprises a bottom oil-collecting can 320 having a circular floor 321 attached or otherwise sealed to the bottom axial face 313 of the filtration media 310. Pedestals 322 can extend downwardly from the floor 321 and they can have slanted lower surfaces for abutting against the sloped contour of the canister's bottom wall structure 213. A plug 323 can be provided in the floor 321 for release of excessive water and/or oil accumulation within the inlet chamber 111. The collecting can 320 can further comprise a ledge 324 surrounding the floor 321 and projecting upwardly therefrom. The ledge 324 can have slots 325 (e.g., to allow upward gas flow to the outlet 112), inward ribs 326 (e.g., to encourage downward migration of oil droplets), and/or outward tabs 327 (e.g., to centrally orient the cartridge 300 within the canister 210).

Figure 5:
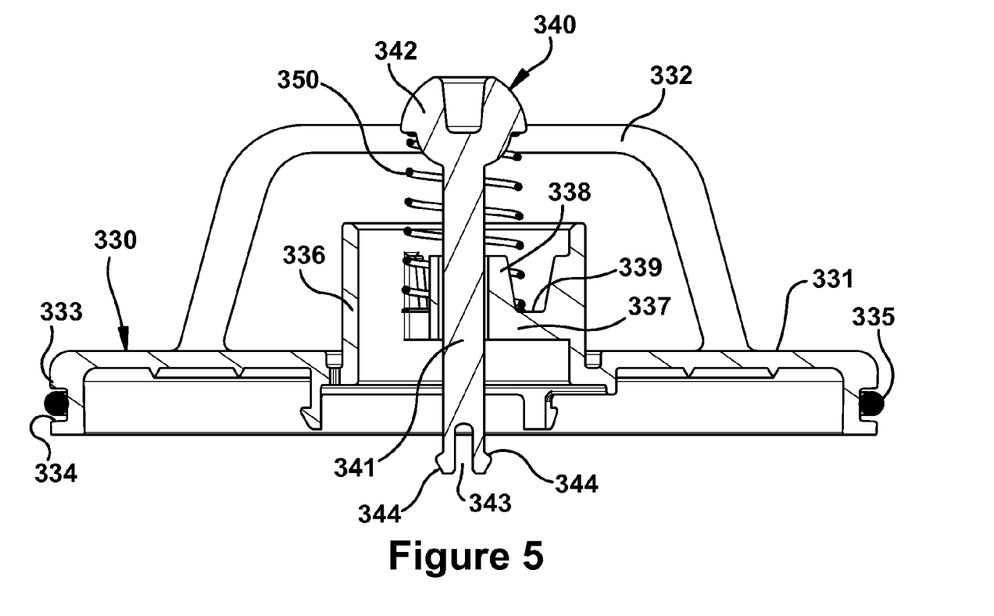
FIG. 5 is a sectional view of an end cap of the filter cartridge.

The filter cartridge 300 further comprises a top end cap 330, a plunger 340, and a spring 350, which may be better seen by referring additionally to FIG. 5. The end cap 330 comprises a circular ceiling 331 that is attached or otherwise sealed to the top axial face 314 of the filtration media 310. Handles 332, extending upwardly from the ceiling 331, can be provided for convenient cartridge transfer/installation. A relatively short rim 333 can extend downwardly from the ceiling's circumference, the rim 333 being provided with groove 334 or other seating surface for a seal 335 (e.g., an O-ring). In the filter assembly 100, the seal 335 seats against the canister's inside surface and seals the chambers 111/114 from the outlet chamber 112.

A sleeve 336 projects upwardly from the ceiling 331 in a stack-like manner, and webs 337 spoke radially inward from the sleeve's inner surface. The webs 337 serve to centrally support a stem-receiving tube 338 and a spring shelf 339 therearound. The spoke-like support of the tube 338 and the shelf 339 results in relatively wide fluid openings between adjacent webs 337 so that (when sleeve's upper end is not sealed) the chamber 114 is in fluid communication with the inlet chamber 111.

The plunger 340 has a stem 341 and a head 342 attached to the stem's top end. The stem 341 can have a circular cross-section and is, in any event, sized for slidable receipt within the sleeve tube 338. The bottom end of the stem 341 can include a slot 343 situated between two deflectable fingers 344. The relaxed diameter of the fingers 344 can be greater than that of tube 338 and their deflected diameter can be less therein. In this manner, the fingers 344 can be temporarily deflected to insert the stem 341 through the tube 338 during assembly of the cartridge 300. Once the stem's bottom end clears the tube 338, the fingers 344 can rebound to their relaxed diameter and thereby prevent the plunger 340 from inadvertently sliding completely out of the tube 338.

The plunger head 342 can have a semi-spherical shape with a diameter greater than that of the tube 338 and less than that of the sleeve 336. In relation to the housing 200, and particularly the partition 220, the plunger head diameter is greater than that of pulpit 225 and less than that of the pocket within the hem 226. In this manner, the plunger head 342 can be positioned within pocket, with the pulpit 225 projecting thereabove.

The spring 350 biases the plunger 340 upwardly away from the ceiling 331 and thus upwardly away from the inlet chamber 111. The spring 350 can wind around the stem 341 and it can be captured between the plunger head 342 and the sleeve shelf 339.

Referring briefly back to FIG. 2, the filter assembly 100 is shown in neutral state. In this condition, crankcase pressure is not excessively low and back pressure is not excessively high. It may be noted for future reference that the diaphragm 221 has a slack fold between its clamps 222 and 223, thereby providing the podium 224 with the potential to move upwardly or downwardly from this neutral position.

Figure 6:
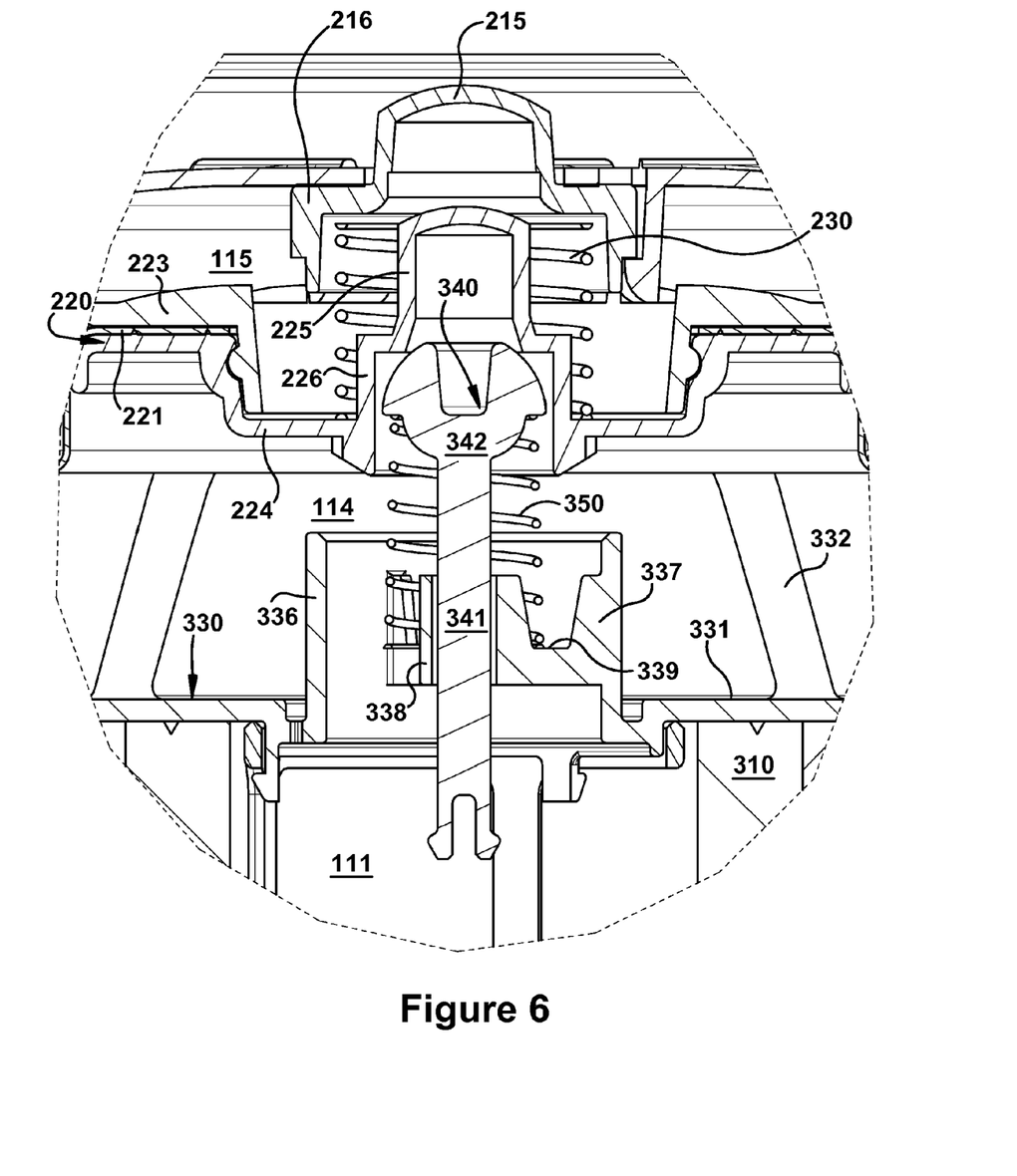
FIG. 6 is a close-up view of the designated region of FIG. 2.
Figure 7:
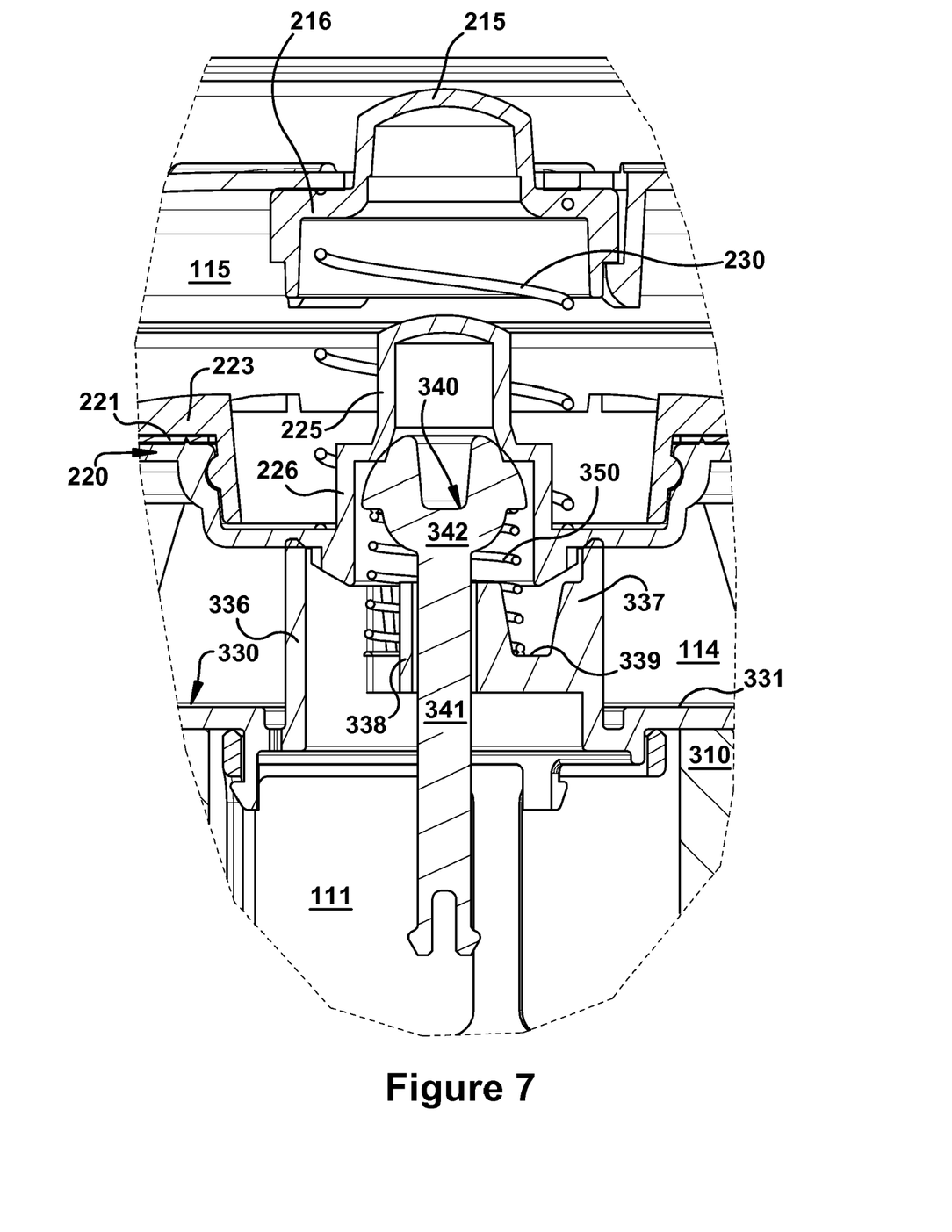
FIG. 7 is a close-up view similar to FIG. 6, except it shows the designated region of the filter assembly in an excessive-crankcase-vacuum condition.
Figure 8:
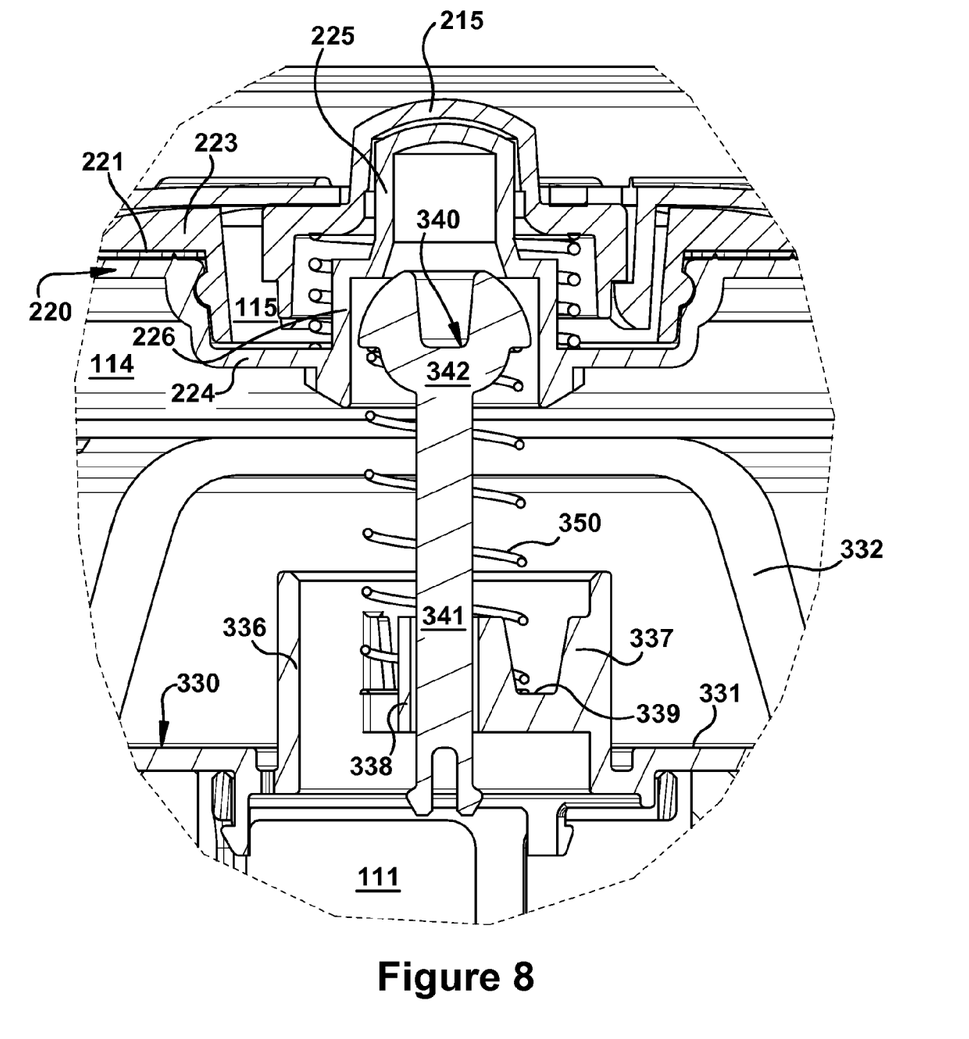
FIG. 8 is a close-up view similar to FIG. 6 and FIG. 7, except that it shows the designated region of the filter assembly in an excessive-back-pressure condition.

Referring now to FIGS. 6-8, they are each a close-up view of the plunger-podium-cupola region of the filter assembly 100. When the filter cartridge 300 is installed in the housing 200, the plunger head 342 is situated within the pocket formed by pulpit hem 226 in the partition podium 224. The spring 230 biases the podium 224 downwardly and the spring 350 biases the plunger head 342 upwardly. The pressure-regulating chamber 114 is in communication with the inlet 101 and thus crankcase ventilation fumes. And, when the sleeve 336 is not sealed, the pressure-regulating chamber 114 is also in communication with the inlet chamber 111 (which is representative of the filter's back pressure).

In FIG. 6, the filter assembly 100 is in the neutral condition shown in FIG. 2. In this condition, fluid pressure within the regulating chamber 114 will reflect that the engine 10 is not running at an excessively negative crankcase pressure and that the filter back pressure is not unacceptably high. In other words, fluid pressure within the regulating chamber 114 does not overcome the downward bias of spring 230 whereby it holds the pulpit 225 below the cupola 215. And fluid pressure within this chamber 114 does not overcome the upward bias of spring 350 whereby the plunger 340 holds the podium 224 above the top end of the sleeve 336. Accordingly, crankcase-ventilation fumes flow (through the gas inlet 101), into the pressure-regulating chamber 114, through the sleeve 336 into the inlet chamber 111, through the filtration media 310 into the outlet chamber 112. Once the filtered gas reaches the chamber 112, it can exit the assembly 100 through the gas outlet 102.

In FIG. 7, the engine 10 is running at an excessive negative intake pressure. In this condition, the vacuum within the regulating chamber 114 overcomes the upward bias of the spring 350 and the podium 224 is pulled downward to seal the top of the sleeve 336. This prevents gas from entering the inlet chamber 111 (and perhaps exaggerating the problem) and it prevents the communication of excessive negative intake pressure from entering the crankcase 11 resulting in damage to the engine's o-rings and seals. The sleeve 336 remains sealed until intake pressure returns to an acceptable level. When this happens, the upward bias of the spring 350 will overcome the fluid pressure within the chamber 114, lift the podium 224 off of the sleeve 336, and reopen the flow path to the inlet chamber 111.

Accordingly, the sleeve 336, the tube 338, the spring shelf 339, the plunger 340, and/or the spring 350, play key pressure-regulating roles in the filter assembly 100. And, significantly, these components are part of the filter cartridge 300 (as opposed to, for example, the filter housing 200). Thus, these key pressure-regulating components are periodically replaced along with the rest of the cartridge 300 during the life of the filter assembly 100.

When the filter assembly 100 is in an excessive-negative-intake-pressure condition, the downward movement of the podium 224 (and thus the partition 220) causes a corresponding decrease in the volume of chamber 114. This volume decrease is offset by a volume increase in the chamber 115, which draws air in from the atmosphere through canister vents. The isolation of the chamber 115 from the rest of the chambers 111-114, and its vented construction, allow it to change sizes and still remain approximately at atmospheric pressure.

The downward movement of the podium 224 will also cause the cupola spring 230 to be expanded. If this expansion exceeds beyond the spring's installed length, the fluid pressure within regulating chamber 114 will need to be sufficient to also overcome the now upward bias of the spring 230. In most engines, excessively-negative-intake-pressure conditions will be intermittent and not unreasonably long. The spring may be installed in a slightly compressed state.

In FIG. 8, the filter assembly 100 is experiencing unacceptable back pressure. This condition can occur, for example, when the filtration media 310 becomes clogged with filtrates and it is time to replace the cartridge 300. In any event, fluid pressure within the regulating chamber 114 (which is reflective of the back pressure) overcomes the downward bias of the spring 230 and pushes the podium 224 upward so that the pulpit 225 is inserted into cupola 215. This pulpit-positioning can serve as a visual indication that the cartridge 300 is ready for replacement if, for example, the cupola 215 is made of a clear material and the pulpit 225 has a relatively bright color. In the cupola occupied condition, crankcase-ventilation fumes in the chamber 114 are still in fluid communication with the inlet chamber 111. But the limited gas flow through the cartridge 300 causes the crankcase ventilation fumes to essentially bypass the filter assembly 100 and exhaust with combustion gas from the engine 10.

When the filter assembly 100 is operating in a too-high-back-pressure condition, the volume of the chamber 115 can be substantially reduced to accommodate the elevated position of the partition 220. And the upward movement of the podium 224 when transitioning to this condition will facilitate expelling air from the chamber 115 through the canister vents. In the illustrated embodiment, for example, the chamber's volume is reduced to essentially zero.

The upward movement of the podium 224 will also cause the cartridge spring 350 to expand. When the filter assembly 100 is converted to a too-high-back-pressure condition, it is usually a permanent conversion that is rectified by replacing the cartridge 300. The spring 350 will be renewed upon cartridge replacement.

Although the engine 10, the filter assembly 100, the filter cartridge 300, and/or the end cap 320 have been shown and described with respect to certain embodiments, equivalent alterations and modifications should occur to others skilled in the art upon review of this specification and drawings. If an element (e.g., component, assembly, system, device, composition, method, process, step, means, etc.), has been described as performing a particular function or functions, this element corresponds to any functional equivalent (i.e., any element performing the same or equivalent function) thereof, regardless of whether it is structurally equivalent thereto. And while a particular feature may have been described with respect to less than all of embodiments, such feature can be combined with one or more other features of the other embodiments.

The invention claimed is:

1. A filter cartridge comprising:
   filtration media having a radial outer surface, a radial inner surface defining an inlet chamber, an upper axial face, and a lower axial face;
   a top end cap including a ceiling sealed to the upper axial face of the filtration media, a center sleeve extending through the ceiling and communicating with the inlet chamber, and a tube within the sleeve;
   a plunger including a stem slidably received in the tube and a head having a radial span greater than that of tube and less than that of the sleeve; and
   a spring biasing the plunger's head axially upward and away from the inlet chamber.

2. A filter cartridge as set forth in claim 1, wherein the end cap further includes a shelf surrounding the tube within the sleeve, and wherein the spring is captured between this shelf and the plunger's head.

3. A filter cartridge as set forth in claim 1, wherein the end cap includes a rim surrounding the ceiling and having a groove formed therein.

4. A filter cartridge as set forth in claim 3, wherein a seal is situated within the groove.

5. A filter cartridge as set forth in claim 1, wherein the end cap includes a rim surrounding the ceiling and a seal situated around the rim.

6. A filter cartridge as set forth in claim 1, wherein the end cap includes handles extending upwardly from the lid.

7. A filter cartridge as set forth in claim 1, wherein the plunger's head has a semi-spherical shape.

8. A filter cartridge as set forth in claim 1, wherein the plunger's stem has a lower end with an axial slot and fingers on either side of the slot, wherein the fingers define a relaxed diameter greater than the tube's inner diameter and wherein they are deflectable to a diameter less than that of the tube's inner diameter whereby the stem may be inserted therethrough.

9. A filter cartridge as set forth in claim 1, further comprising an oil-collection can having a floor sealed to the lower axial end of filtration media.

10. A filter cartridge as set forth in claim 9, wherein the oil-collecting can includes pedestals projecting downwardly from the floor and wherein the pedestals have slanted bottoms to abut against the sloped contour of a bottom wall structure of a housing canister.

11. A filter cartridge as set forth in claim 10, wherein the oil-collecting can further comprises a ledge extending upwardly from the outer circumference of the floor and surrounding a lower portion of the outer radial surface of the filtration media.

12. A filter cartridge as set forth in claim 11, wherein the oil-collecting can includes ribs projecting radially inward from the ledge, these ribs contacting the outer radial surface of the filtration media to encourage downward migration of oil droplets; and/or wherein the oil-collecting can includes outward tabs that project radially outward from the ledge to center the cartridge within a housing canister.

13. A filter cartridge as set forth in claim 1 and a housing in which the filter cartridge is installed, wherein the housing includes a movable pressure-regulating podium that is lifted by the cartridge's plunger when a regulating chamber is at a pressure overcoming the biasing force of the spring.

14. A filter cartridge as set forth in claim 1 and a housing in which the filter cartridge is installed;
   wherein the housing comprises a canister forming an envelope and a partition within the envelope forming a movable border between a pressure-regulating chamber and a volume-compensating chamber;

wherein the movable partition comprises an annular diaphragm having its outer diameter anchored to the canister and its inner diameter connected to a podium;

wherein the podium is lifted by the cartridge's plunger away from the sleeve when pressure within the pressure-regulating chamber is not excessively negative; and wherein the podium closes the sleeve and prevents flow to the inlet chamber when pressure within the regulating chamber becomes excessively negative.

15. A filter cartridge as set forth in claim 1, wherein the end cap further comprises a shelf surrounding the tube within the sleeve, a rim surrounding the ceiling, a seal seated on the rim, and handles extending upwardly from the ceiling.

16. A filter cartridge as set forth in claim 15, further comprising an oil-collection can including:
- a floor sealed to the lower axial end of filtration media;
- pedestals projecting downwardly from the floor, the pedestals having slanted bottoms to abut against the sloped contour of a bottom wall structure of a housing canister;
- a ledge extending upwardly from the outer circumference of the floor and surrounding a lower portion of the outer radial surface of the filtration media;
- ribs projecting radially inward from the ledge, these ribs contacting the outer radial surface of the filtration media to encourage downward migration of oil droplets; and
- outward tabs that project radially outward from the ledge to center the cartridge within the housing canister.

17. A filter cartridge as set forth in claim 16, wherein the plunger's stem has a lower end with an axial slot and fingers on either side of the slot, wherein the fingers define a relaxed diameter greater than the tube's inner diameter and wherein they are deflectable to a diameter less than that of the tube's inner diameter whereby the stem may be inserted therethrough.

18. A filter assembly comprising a housing and the filter cartridge set forth in claim 1 installed in the housing.

19. An internal combustion engine comprising a crankcase with a breather and an oil pan, an air inlet line, an exhaust line, and the filter assembly set forth in claim 18, wherein the crankcase breather is connected to an inlet port of the filter assembly and wherein an outlet port of the filter assembly is connected to the air inlet line.

20. An internal combustion engine as set forth in claim 19, wherein the oil drain of the filter assembly is connected to the crankcase oil pan.

\* \* \* \* \*